United States Patent [19]

Kumada

[11] Patent Number: 5,671,339
[45] Date of Patent: Sep. 23, 1997

[54] OUTPUT APPARATUS

[75] Inventor: Shuichi Kumada, Yokohama, Japan

[73] Assignee: Canon Kabushiki Kaisha, Tokyo, Japan

[21] Appl. No.: 314,443

[22] Filed: Sep. 28, 1994

Related U.S. Application Data

[63] Continuation of Ser. No. 896,792, Jun. 9, 1992, abandoned, which is a continuation of Ser. No. 830,477, Feb. 7, 1992, abandoned, which is a continuation of Ser. No. 673,269, Mar. 21, 1991, abandoned, which is a continuation of Ser. No. 336,026, Apr. 11, 1989, abandoned.

[30] Foreign Application Priority Data

Apr. 18, 1988 [JP] Japan ................................ 63-095847
Jun. 22, 1988 [JP] Japan ................................ 63-152267

[51] Int. Cl.$^6$ .................................................. G06K 15/00
[52] U.S. Cl. .................................... 395/101; 395/117
[58] Field of Search ............................ 395/101, 112, 395/114, 115, 116, 117, 167, 171; 382/21, 23, 190; 400/70, 71, 72, 73; 345/141, 142, 143, 144; 358/470

[56] References Cited

U.S. PATENT DOCUMENTS

| | | | |
|---|---|---|---|
| 4,353,653 | 10/1982 | Zimmerman | 400/70 |
| 4,680,805 | 7/1987 | Scott | 382/22 |
| 4,686,525 | 8/1987 | Nagata | 340/790 |
| 4,715,006 | 12/1987 | Nagata | 395/115 |
| 4,891,769 | 1/1990 | Tasaki | 305/112 |
| 4,926,347 | 5/1990 | Uchida et al. | 364/519 |

FOREIGN PATENT DOCUMENTS

| | | | |
|---|---|---|---|
| 2553208 | 4/1985 | France | G06K 15/00 |
| 3437221 | 4/1985 | Germany | 364/519 |
| 3633613 | 4/1987 | Germany | 364/519 |
| 58-003083 | 1/1983 | Japan | 364/519 |
| 60-104378 | 6/1985 | Japan | 364/519 |
| 61-197252 | 9/1986 | Japan . | |
| 61-232484 | 10/1986 | Japan . | |
| 2182471 | 5/1987 | United Kingdom | G06K 15/10 |

OTHER PUBLICATIONS

Star Micronics Co., Ltd pp. 24–25 of 1987 manual.

Primary Examiner—Arthur G. Evans
Attorney, Agent, or Firm—Fitzpatrick, Cella, Harper & Scinto

[57] ABSTRACT

An output apparatus which includes a font information memory for outputting a pattern on the basis of information from a host computer, a selector for designating an attribute of fonts, and a dot printer for outputting a table of the fonts having the attribute designated by the selector.

12 Claims, 6 Drawing Sheets

FIG. 4

| PITCH | POINT SIZE | STYLE | STROKE WEIGHT | TYPE FACE | SAMPLE |
|---|---|---|---|---|---|
| 10.00 | 3.60 | Upright | Medium | 80:Mincho | ABCDEfghij123!#$ '※:∧∨●⌐ |
| 10.00 | 3.60 | Upright | Medium | 80:Mincho | チツテトナジズゼソダアイウ。─ `ァェサシセタロ |
| 7.50 | 4.80 | Upright | Medium | 80:Mincho | ABCDEfghij123!#$ |
| 7.50 | 4.80 | Upright | Medium | 80:Mincho | チツテトナジズゼソダアイウ。─ ` |
| 10.00 | 3.60 | Upright | Medium | 81:Gothic | ABCDEfghij123!#$ '※:∧∨● |
| 10.00 | 3.60 | Upright | Medium | 81:Gothic | チツテトナジズゼソダアイウ。─ `ァェサシセタ |
| 7.50 | 4.80 | Upright | Medium | 81:Gothic | ABCDEfghij123!#$ |
| 7.50 | 4.80 | Upright | Medium | 81:Gothic | チツテトナジズゼソダアイウ。─ ` |

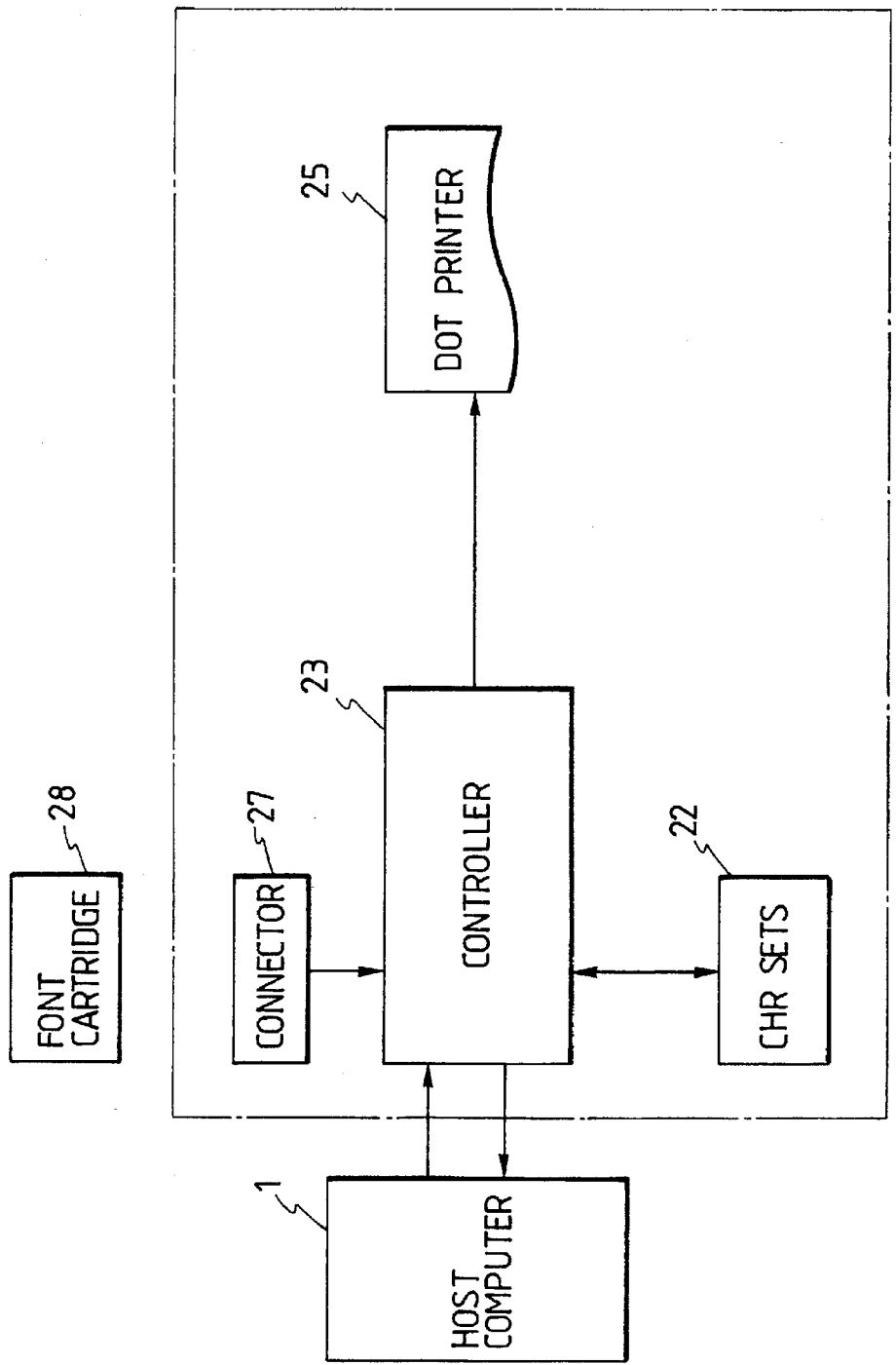

FIG. 7

| GRAPHIC SET | PITCH | POINT SIZE | STYLE | STROKE WEIGHT | TYPE FACE | SAMPLE |
|---|---|---|---|---|---|---|
| FONT CARTRIDGE | | | | | | |
| R 001 ALP10. ROMA | | | | | | |
| [J] | 10.00 | 12.00 | Upright | Medium | 0:Line Print | ABCDEfghi |
| R 004 ALP10. KATA | | | | | | |
| [I] | 10.00 | 12.00 | Upright | Medium | 0:Line Print | チツテトナ |
| R 005 A2040M ROMA | | | | | | |
| [J] | 12.00 | 12.00 | Upright | Medium | 80:Mincho | ABCDEfg |
| R 008 A2040M KATA | | | | | | |
| [I] | 12.00 | 12.00 | Upright | Medium | 80:Mincho | チツテトナジズゼ |
| R 009 A2040M HIRA | | | | | | |
| [1] | 12.00 | 12.00 | Upright | Medium | 80:Mincho | ちつてとなじずぜぞだ |
| R 010 A2040M N_hKEI | | | | | | |
| [)#4] | 12.00 | 12.00 | Upright | Medium | 192:Keisen 1 | ├┼┼┐┼┼ ┼ |

OUTPUT APPARATUS

This application is a continuation of application Ser. No. 07/896,792 filed Jun. 9, 1992, now abandoned, which is a continuation of application Ser. No. 07/830,477 filed Feb. 7, 1992, now abandoned, which is a continuation of application Ser. No. 07/673,269 filed Mar. 21, 1991, now abandoned, which is a continuation of application Ser. No. 07/336,026 filed Apr. 11, 1989, now abandoned.

BACKGROUND OF THE INVENTION

1. Field of the Invention

The present invention relates to an output apparatus used with various types of printers and, more particularly, to an output apparatus capable of outputting a table of font information of a desired attribute.

2. Related Background Art

A conventional apparatus capable of outputting a table of font information outputs a table of all font information stored in the system.

In the conventional apparatus described above, however, the following problem arises when the list of all font information stored in the system is output.

When the number of fonts existing in a printer is large, the number of sheets to be output is increased. When only some pieces of font information are required, the output of all the stored font information results in a large number of sheets being wasted. This also occurs in an apparatus to which a font cartridge is attached.

SUMMARY OF THE INVENTION

The present invention has been made in consideration of the above situation. Its object is to provide an output apparatus which includes a means for designating attributes such as a type and number for font information, wherein a table of only designated font information can be output.

It is another object of the present invention to provide an output apparatus for outputting font information in accordance with a cartridge attached thereto or a designated attribute.

BRIEF DESCRIPTION OF THE DRAWINGS

FIG. 4 is a view showing an information output when point size is 7 point or less;

FIG. 5 is a block diagram of a printing apparatus according to a second embodiment of the present invention;

FIG. 7 is a view showing an output example of font information stored in the font cartridge.

DETAILED DESCRIPTION OF THE PREFERRED EMBODIMENT

A preferred embodiment of the present invention will be described with reference to the accompanying drawings.

Figure 1:
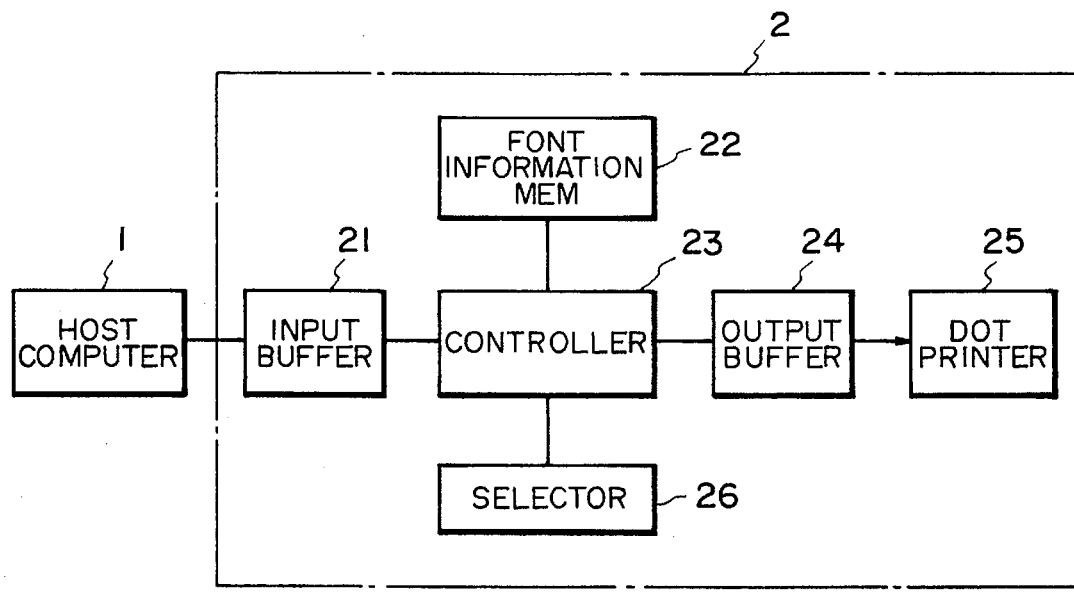
FIG. 1 is a block diagram showing an arrangement of a printing apparatus according to an embodiment of the present invention.

FIG. 1 is a block diagram showing an arrangement of a printing apparatus according to one embodiment of the present invention.

Referring to FIG. 1, a host computer 1 is connected to the input of an input buffer 21, and the output of the input buffer 21 is connected a controller 23. The controller 23 is also connected to a font information memory 22, a selector 26, and an output buffer 24. The output of the output buffer 24 is connected to a dot printer 25. The input buffer 21, the font information memory 22, the controller 23, the selector 26, the output buffer 24, and the dot printer 25 constitute a printing apparatus main body 2. The main body 2 comprises a microprocessor including a RAM and a ROM.

The host computer 1 externally outputs printing data and a printing command. A printer data code output from the host computer 1 is input to the input buffer 21. The font information memory 22 stores dot patterns of plural types of characters and attribute information of the character set. The controller 23 controls the operations of the overall printing apparatus. The output buffer 24 sends converted pattern data to the dot printer 25. The dot printer 25 forms a permanent visible image on a sheet on the basis of the converted pattern data. The selector (e.g., keys) 26 selectively outputs a table of desired character attributes (to be described later). The selector 26 can select one or more attributes. When slots for receiving font cartridges are formed in the printer, one of the slots may be designated.

Figure 2:
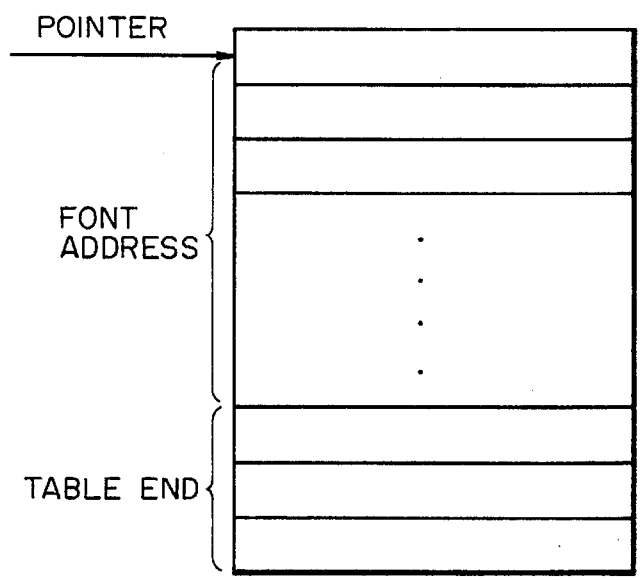
FIG. 2 is a format showing a table in which font addresses are stored.

FIG. 2 is a table for storing font addresses.

No font addresses are stored in the table end of the font address table shown in FIG. 2.

Figure 3:
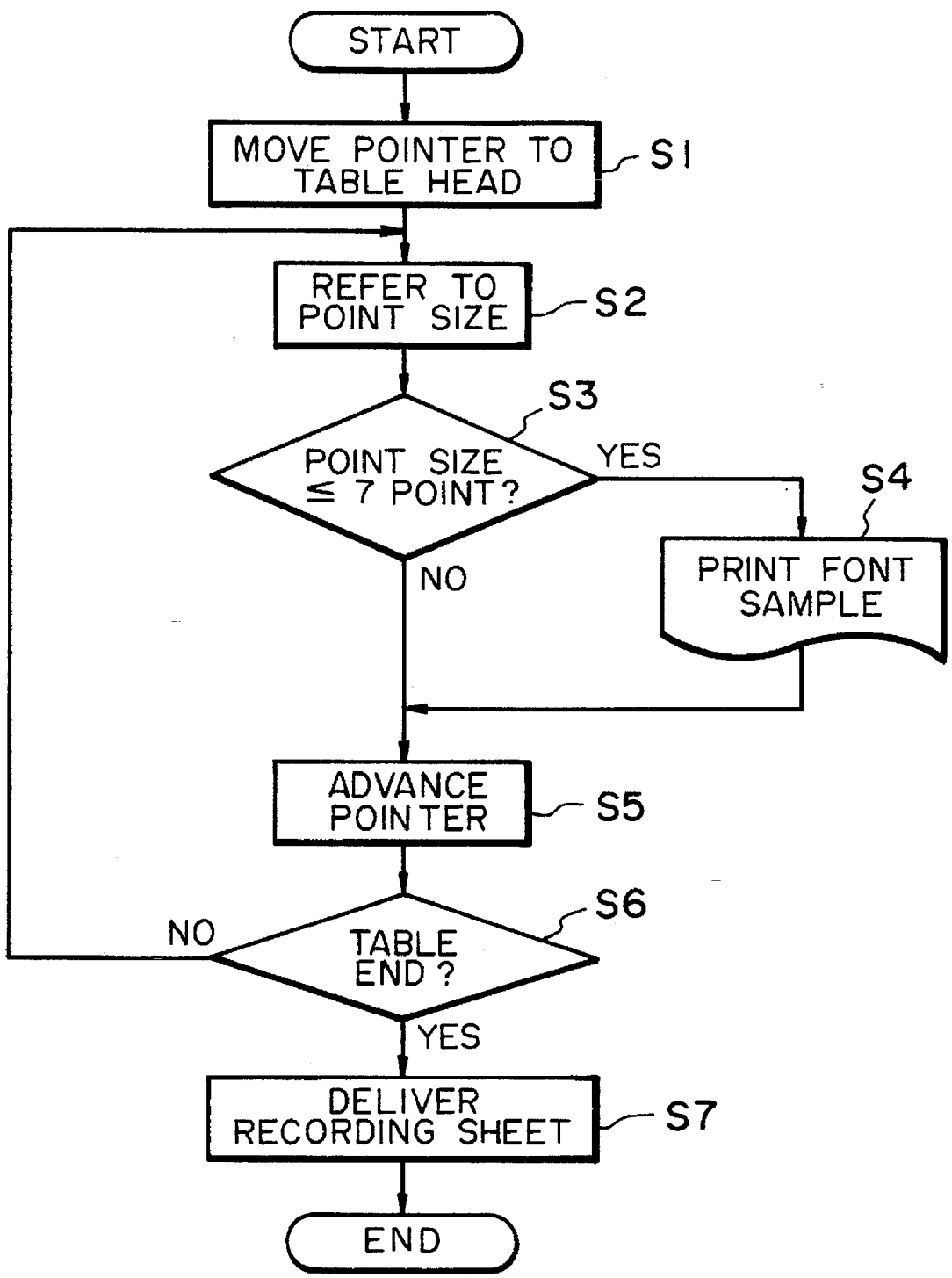
FIG. 3 is a flow chart for explaining operations until information of fonts of 7 point or less is output.

FIG. 3 is a flow chart for explaining operations until information of fonts having point sizes of 7 point or less is output.

Character attributes of the font include a character pitch, a character style, and a character point size.

The flow chart in FIG. 3 will be described below.

In step S1, a printer is moved to the font address table (FIG. 2) head.

In step S2, the controller 23 refers to a point size column of the font information memory 22.

If the point size of the character is less than 7 point, the flow advances to step S4, and the corresponding font samples (i.e., information of font) are printed at the dot printer 25. In step S5, the pointer is advanced, and the flow advances to step S6.

However, if the point size is larger than 7 point, the pointer is advanced in step S5, and the flow advances to step S6.

If the pointer designates the font address table end, all font samples (information of fonts) having point sizes of 7 point or less have been printed. Therefore, a sheet having printed contents of the font information of 7 point or less is discharged.

However, if the pointer does not designate the font address table end, the flow returns to step S2.

As is apparent from the description, it is possible to print only information of fonts having point sizes of 7 point or less and discharge the printed sheet.

FIG. 4 shows an information output of fonts having point sizes of 7 point or less. In this case, pitch sizes, point sizes, styles, stroke weights (thickness or density of a printed character), type faces (e.g., Ming and Gothic), and character samples are output.

In the above embodiment, of all pieces of character attribute information, information of fonts having point sizes of 7 point or less is output. However, by using the same method as described above, information of other character attributes (e.g., the character pitch and the character style) can be selected and output.

It is also possible to select the number and type of font information and output them.

As has been described above, the attributes such as the type and number of font information are designated, and a table of only the designated information can be output, thereby obtaining a table of only desired fonts.

FIG. 5 is a block diagram showing an arrangement to which an external font cartridge is connected. The same reference numerals as in FIG. 1 denote the same parts. An input/output buffer is not shown for illustrative convenience. Referring to FIG. 5, a font cartridge 28 is connected to a controller 23 through a connector 27. A plurality of connectors (right and left connectors) may be used, and a priority may be assigned to these connectors.

Figure 6:
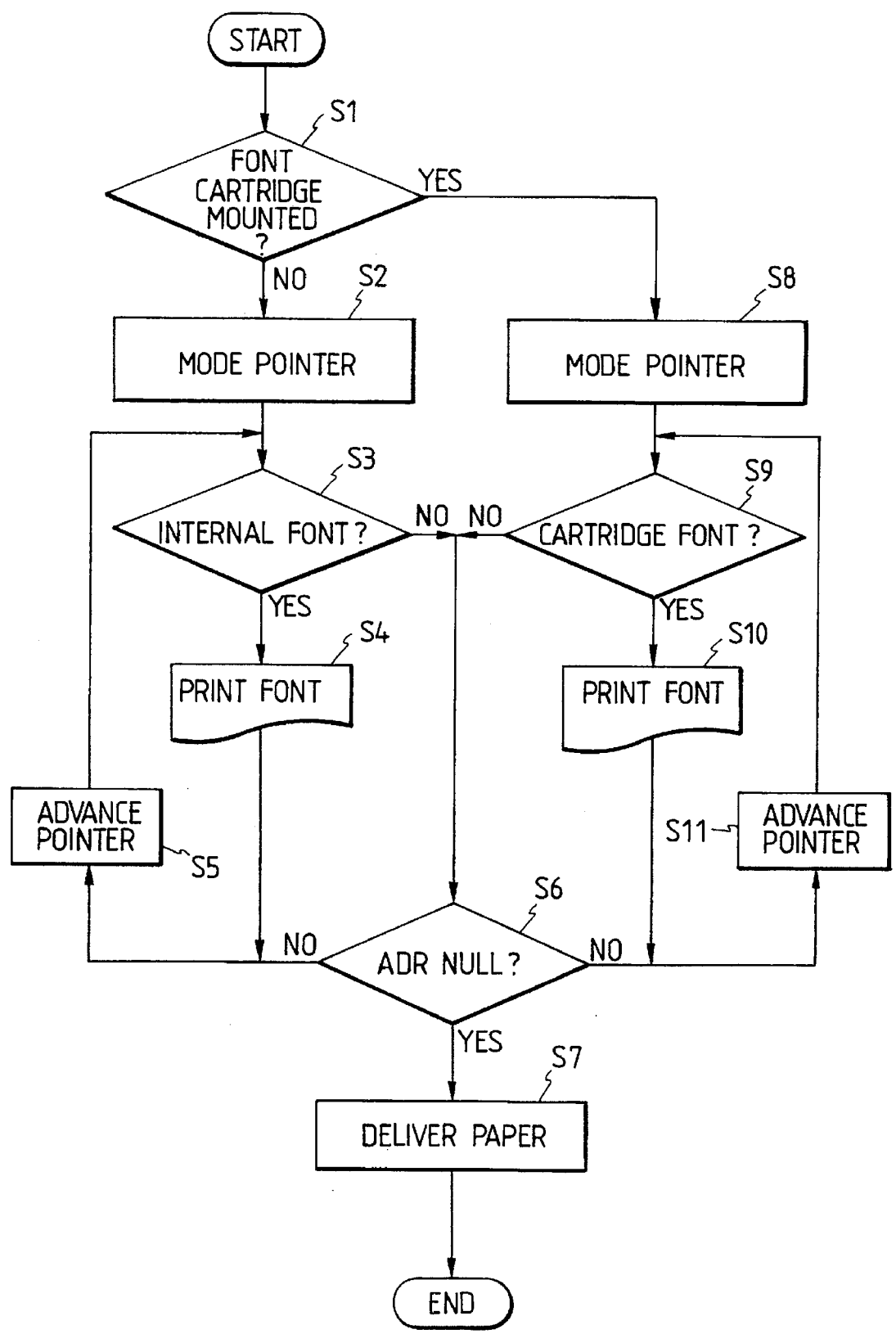
FIG. 6 is a flow chart for outputting font information stored in a font cartridge attached to the printer.

FIG. 6 is a flow chart showing operations until font information is printed and output. Referring to FIG. 6, the controller 23 determines in step S1 whether the font cartridge 28 is mounted to the connector 27. A mounting state is detected by checking whether, e.g., a pair of arbitrary connecting pins of the connector 27 connected to the controller 23 are short-circuited upon mounting of the font cartridge 28. If NO in step S1, the flow advances to step S2, and the pointer is moved to the head or start address of the internal font address table shown in FIG. 2. The flow advances to step S3. If the content represented by the pointer is an internal font, the flow advances to step S4. The internal font information is printed at a dot printer 25.

However, if it is determined in step S3 that the content represented by the pointer is not an internal font, the flow advances to step S6. If the content of the pointer is not "NULL", the flow advances to step S5. However, if YES in step S5, the flow advances to step S7 since all information associated with the internal font in the table has been printed out. The contents of the internal font information are printed at the printer, and the printed sheet is delivered. Note that the "NULL" state represents a state in which no font address is available.

If the controller 23 determines in step S1 that the font cartridge 28 is mounted, the flow advances to step S8, and the pointer is moved to the head of the font address table of the font cartridge 28. The flow advances to step S9. If the content of the pointer represents a font of the font cartridge, the flow advances to step S10, and information of the font of the font cartridge is printed at the dot printer 25. The pointer is incremented by one in step S11, and the flow returns to step S9.

If the content of the pointer does not represent a font of the font cartridge 28, the flow advances to step S6. If the content of the pointer does not represent the "NULL" state, the flow advances to step S7. The contents of the font information of the font cartridge 28 are printed, and the printed sheet is delivered.

As described above, when the font cartridge 28 is mounted in the printing apparatus, only font information of the font cartridge 28 is printed. After the contents of the font information are printed, the printed sheet can be delivered.

FIG. 7 shows an output example of font information when the font cartridge is mounted to the output apparatus.

In the above embodiment, a character set storage means detachably mounted to the printing apparatus through the connector is exemplified as a font cartridge. However, the printing apparatus of the present invention is also applicable to a character set storage means such as an IC ROM card, an optical disk ROM having the same function as the font cartridge, and the like.

As described above, the character font information stored in the printing apparatus and the character font information stored in the external character set storage means can be selectively used to prevent printing of unnecessary font information.

The printing apparatus according to the present invention has the above arrangement. Therefore, waste of recording media, i.e., sheets at the time of output of font information can be prevented, and only desired font information can be printed within a short period of time.

Control in FIG. 3 may be combined with control in FIG. 6 to output font information of a given attribute from a font cartridge connected to the printing apparatus in accordance with the size conditions, the attribute conditions, and font cartridge connecting conditions. Font information of a given attribute from the internal cartridge and the cartridge connected to the printing apparatus also may be output.

What is claimed is:

1. An output apparatus comprising:
    memory means for storing a plurality of fonts each said font having a plurality of attributes;
    designation means for designating a condition of at least some of said attributes;
    discrimination means for discriminating for each of the plurality of fonts stored in said memory means whether the font satisfies the condition of said attributes designated by said designation means; and
    output means for outputting, as a list, information on all the fonts discriminated by said discrimination means as fonts that satisfy the designated condition of said attributes.

2. An apparatus according to claim 1, wherein said output means comprises a printer.

3. An apparatus according to claim 1, wherein said designation means comprises a key.

4. An apparatus according to claim 1, wherein the plurality of the attributes comprise a pitch, a point size, a style and a stroke weight.

5. An apparatus according to claim 1, wherein the information outputted by said output means represents a pitch, a point size, a style, a stroke weight, a typeface and a character sample.

6. An apparatus according to claim 1, wherein the condition of the attributes represents a range of the attributes in numerical value.

7. An output method using a memory which stores a plurality of fonts each said font having a plurality of attributes and a designation device which designates a condition of at least some of said attributes, said method comprising the steps of:
    discriminating for each of the plurality of fonts stored in the memory whether the font satisfies the condition of the attributes designated by the designation device; and
    outputting, as a list, information on all the fonts discriminated in said discriminating step as fonts that satisfy the designated condition of the attributes.

8. A method according to claim 7, wherein said outputting step outputs the information using a printer.

9. A method according to claim 7, wherein the designation device comprises a key.

10. A method according to claim 7, wherein the plurality of attributes comprise a pitch, a point size, a style and a stroke weight.

11. A method according to claim 7, wherein the information outputted in said outputting step represents a pitch, a point size, a style, a stroke weight, a typeface and a character sample.

12. A method according to claim 7, wherein the condition of the attributes represents a range of the attributes in numerical value.

* * * * *